United States Patent [19]

Hougaard

[11] Patent Number: 4,619,526
[45] Date of Patent: Oct. 28, 1986

[54] SUCTION FILM HOLDER

[75] Inventor: Finn Hougaard, Copenhagen, Denmark

[73] Assignee: Eskofot A/S, Ballerup, Denmark

[21] Appl. No.: 732,411

[22] Filed: May 9, 1985

[30] Foreign Application Priority Data

Sep. 3, 1984 [DK] Denmark .............................. 4213/84

[51] Int. Cl.⁴ ............................................ G03B 27/60
[52] U.S. Cl. ...................................... 355/73; 355/76; 355/87; 355/91
[58] Field of Search ....................... 355/73, 76, 87, 91; 248/363

[56] References Cited

U.S. PATENT DOCUMENTS 2,519,610 8/1950 Sussin .................................... 355/73

FOREIGN PATENT DOCUMENTS 2253125 5/1974 Fed. Rep. of Germany .
2701943 7/1978 Fed. Rep. of Germany .
3102489 1/1981 Fed. Rep. of Germany .

Primary Examiner—Richard A. Wintercorn
Attorney, Agent, or Firm—Cushman, Darby & Cushman

[57] ABSTRACT

A suction film holder for a reproduction camera is formed by a flexible cover in the form of a conveyor band. One or more suction cups and a plurality of transverse grooves are provided in connection with the flexible cover. During the exposure of a sheet of light-sensitive material the transverse grooves tightly abut longitudinal grooves along the rim of an underlying glass plate, the grooves in the glass plate being connectable to an evacuation system.

According to a particularly preferred embodiment air is blown inwards below the flexible cover upon the exposure. In this manner the time for loosening the flexible cover from the underlying glass plate is reduced to 5-10 secs. The blowing in occurs automatically when the vacuum is removed by means of an inflatable membrane in a box situated parallel to a pressurized valve communicating with the vacuum pump. The membrane is thereby blown up by means of vacuum and blows automatically the air inwards below the flexible cover when the vacuum is removed.

14 Claims, 4 Drawing Figures

SUCTION FILM HOLDER

FIELD OF THE INVENTION

The invention relates to a suction film holder preferably for a reproduction camera.

SUMMARY OF THE INVENTION

The object of the invention is to provide a suction film holder which is more flexible than previously known, and in satisfaction thereof the suction film holder is formed by a flexible cover, one or more suction cups being provided in connection with said flexible cover and being connectable to transverse grooves in the flexible cover.

In this manner the flexible cover can serve both as a conveyor band and as a fixing means for the material to be exposed.

According to a particularly preferred embodiment air is blown inwards below the flexible cover after the exposure, whereby the time passing before the light-sensitive material is loosened from said flexible cover can be reduced. The blowing in procedure occurs automatically when the vacuum is removed and is allowed by an inflatable membrane in a box situated parallel to a pressurized valve communicating with the vacuum pump. In this manner the membrane is inflated by means of vacuum and blows in air automatically below the flexible cover when the vacuum is removed.

BRIEF DESCRIPTION OF DRAWING

The invention will be described more detailed below with reference to the accompanying drawing, in which.

DESCRIPTION OF PREFERRED EMBODIMENTS

Figure 1:
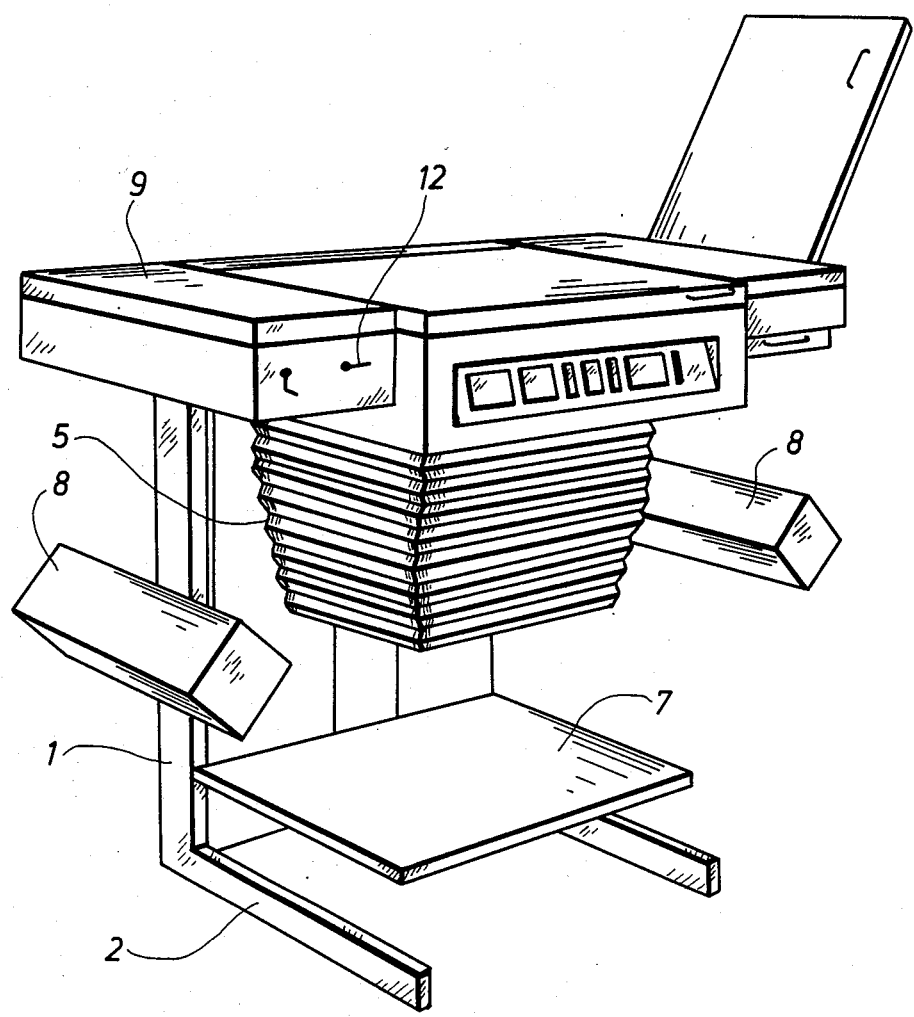
FIG. 1 illustrates a reproduction camera.
Figure 2:
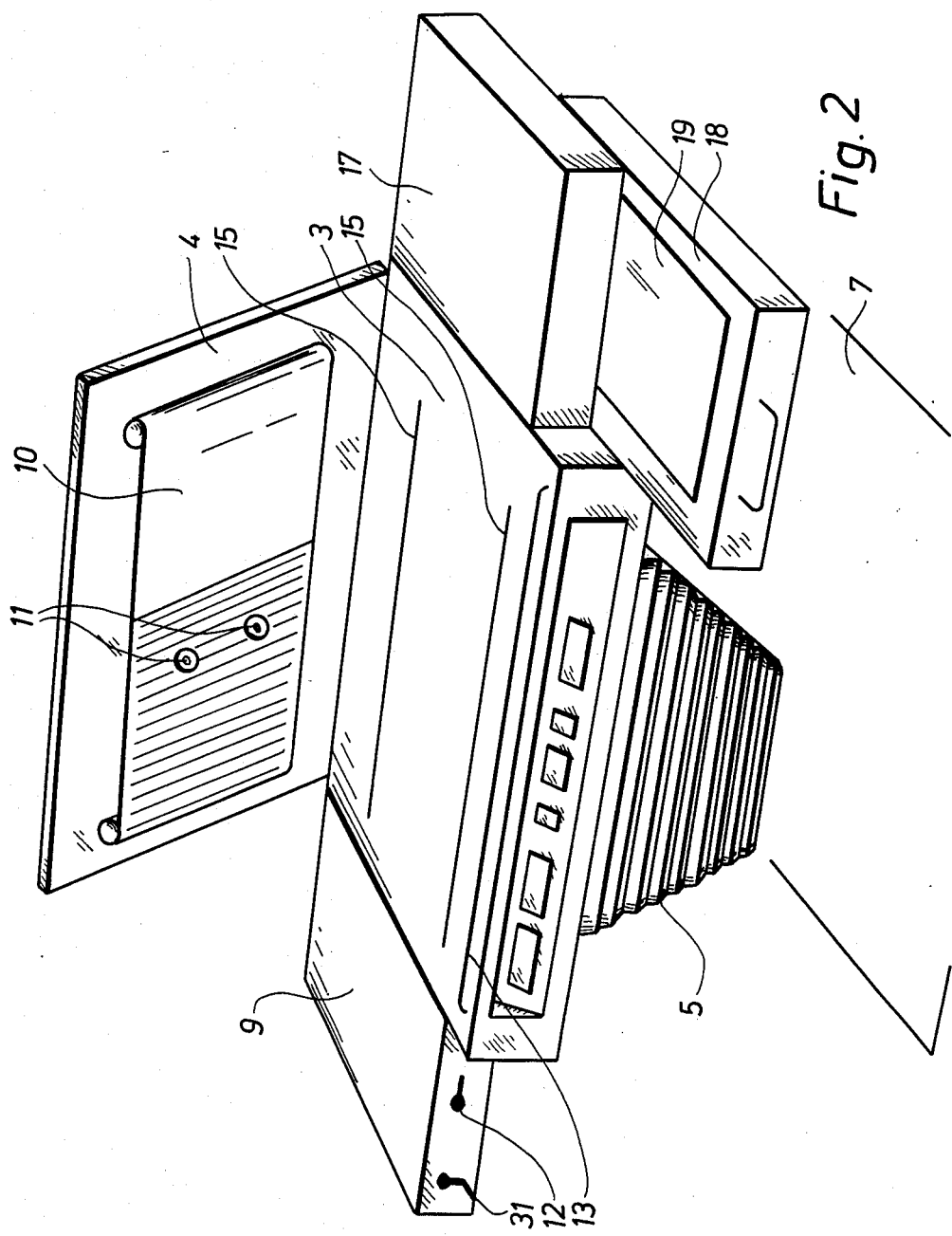
FIG. 2 illustrates the camera of FIG. 1, whereby the lid is opened and thus reveals the conveyor band provided therein.

The reproduction camera of FIG. 1 comprises a frame 1 supported by a foot 2 and at the top carrying a permanent table with a glass plate 3 for a sheet of light-sensitive material. A lid 4 may cover the glass plate 3.

A photographic objective is carried by a bellows 5 and is up- and downwardly displaceable. A table 7 mounted in vertical guides is provided below the objective, said guides being formed by columns in the frame. In this manner the table is up- and downwardly movable, i.e. towards and away from the objective. The table is adapted so as to support an original document such as a drawing or a typing paper to be reproduced, i.e. projected on the glass plate through the objective.

Illuminating means 8 on pivotal arms are adapted to expose the original document on the table. A computer calculating the position of the various planes is provided in the camera.

A suction film holder in the form of a flexible cover 10 is provided in the lid 4.

Figure 3:
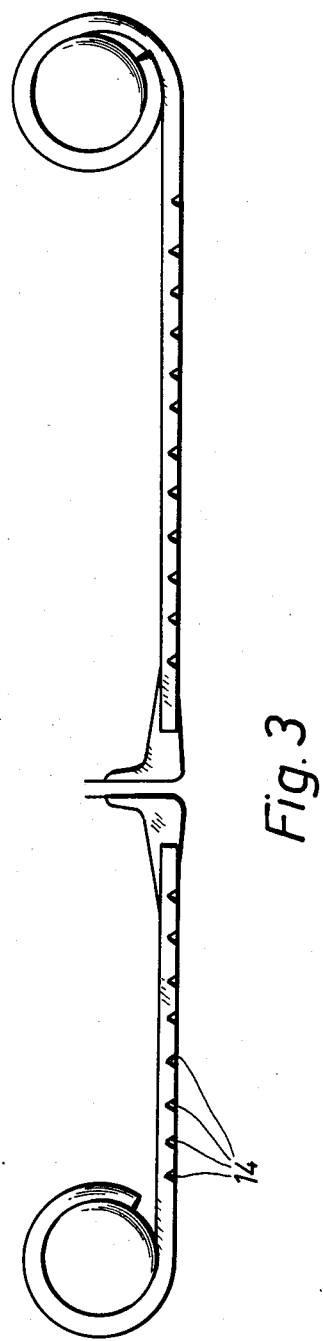
FIG. 3 is a sectional view of the conveyor band.
Figure 4:
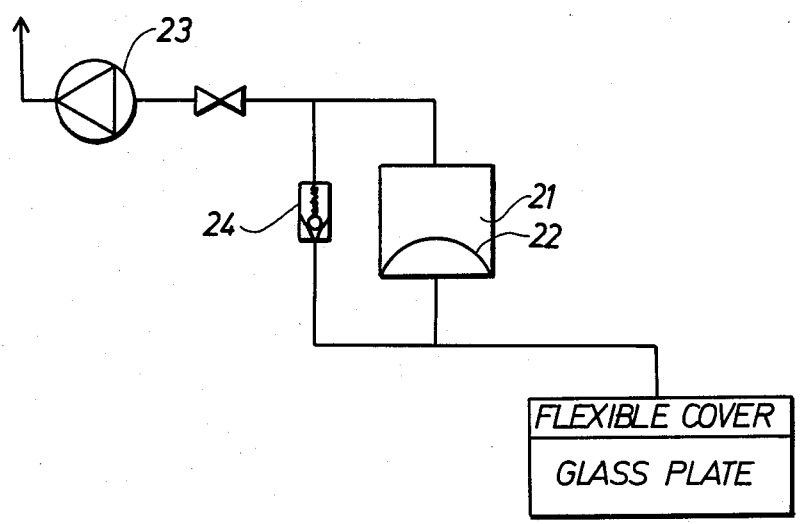
FIG. 4 illustrates the associated suction system.

One or more suction cups 11 connectable to transverse grooves 14 in the underside of the flexible cover are provided in connection with said suction film holder, cf. FIG. 3. The grooves 14 are of a height of about 0.1 mm and the suction thereof is performed through hoses communicating with a vacuum pump 23 through a box 21 with a membrane 22, the connection between the transverse grooves 14 being established by means of longitudinal grooves 15 in the underlying glass plate 3. The transverse grooves 14 serve to fix the flexible cover with the light-sensitive material to the glass plate 3. As the flexible cover 10 is very flexible the same effect is obtained regardless of its position (step and repeat). In this manner the flexible cover 10 can fix the light-sensitive material whether or not the flexible cover is rolled more or less together. The flexible cover can also be used for other purposes, viz. e.g. for transporting the light-sensitive material. Upon the exposure the vacuum under the conveyor band/the vacuum flexible cover is removed. Subsequently several minutes can, however, pass before the flexible cover has loosened in such a manner that the film can be transferred to a developer 17. According to the invention air is blown inwards below the flexible cover whereby the period for the loosening is reduced to 5-10 secs. The blowing in occurs by means of a rubber membrane 22 in a box 21, said box being arranged parallel to a pressurized valve 24, cf. FIG. 4. The membrane is inflated by means of vacuum and blows the air collected automatically inwards below the flexible cover when the vacuum is removed. In this manner the period for the loosening is reduced to said 5-10 secs.

The flexible cover with the transverse grooves 14 can tightly abut longitudinal grooves 15 along the rim of an underlying glass plate 3 by connecting the grooves 15 in the glass plate 3 to a vacuum pump by means of a particular vacuum switch.

As an alternative embodiment the grooves 14 may be inclined.

I claim:

1. A movable suction film holder preferably for a reproduction camera comprising a flexible cover with one or more suction cups for advancing the film and a number of substantially transverse grooves to be evacuated separately wherein air is blown under the flexible cover after the exposure, but before the advancing of the film by means of the suction cups.

2. A suction film holder as claimed in claim 1, wherein the grooves are of a height of about 0.1 mm.

3. A suction film holder as claimed in claim 1, wherein the grooves are wavy.

4. A suction film holder as claimed in claim 1, wherein the transverse grooves tightly abut longitudinal grooves along the rim of an underlying glass plate during the exposure.

5. A suction film holder as claimed in claim 1, wherein the blowing in of air is carried out by means of an inflatable membrane in a box situated parallel to a pressurized valve, said membrane being inflated by means of vacuum and thereby automatically blowing the air collected inwards below the flexible cover when said vacuum is removed.

6. A movable suction film holder as claimed in claim 1, wherein said flexible cover serves as a conveyor band.

7. A reproduction camera comprising a supporting frame with an original plane, an objective plane, and a picture plane, a suction film holder for a sheet of light-sensitive material being provided in connection with said picture plane, said suction film holder being formed by means of a flexible cover provided with one or more suction cups and a plurality of transverse grooves tightly abutting longitudinal grooves along the rim of an underlying glass plate during exposure;

wherein air is blown inwards below the flexible cover after the exposure, said blowing in being carried out by means of an inflatable membrane in a box situated parallel to a pressurized valve, whereby the membrane is inflated by means of vacuum and automatically blows the air collected inwards below the flexible cover when the vacuum is removed.

8. A suction film holder comprising a flexible cover with one or more suction cups and a number of substantially transverse grooves to be evacuated separately, wherein air is blown in under said flexible cover after exposure of said film and wherein said blowing is carried out by means of an inflatable membrane, said membrane situated parallel to a pressurized valve and inflated by means of a vacuum and thereby automatically blowing the air collected within said membrane to below said flexible cover when said vacuum is removed.

9. Transporting suction film holder and release mechanism comprising:
   (a) flexible cover means for holding said film in place during exposure, said flexible cover means including one or more suction cups and a number of substantially transverse grooves;
   (b) transporting means arranged to move said flexible cover and thereby said film into position for exposure and away from said exposure position after exposure;
   (c) vacuum means for applying a vacuum to said flexible cover, suction cups and transverse grooves during exposure of said film; and
   (d) releasing means for blowing air under said flexible cover, suction cups and transverse grooves after said film is exposed.

10. Transporting suction film holder and release mechanism of claim 9 wherein said releasing means comprises an inflatable membrane, said membrane arranged such that it is inflated when vacuum is applied to said flexible cover and deflated when said vacuum is released, thereby blowing air under said flexible cover.

11. Transporting suction film holder and release mechanism of claim 10 wherein said inflatable membrane is in a box situated parallel to a pressurized valve.

12. A transporting suction film holder and release mechanism as claimed in claim 9, wherein said grooves are of a height of about 0.1 mm.

13. A transporting suction film holder and release mechanism as claimed in claim 9, wherein said grooves are wavy.

14. A transporting suction film holder and release mechanism as claimed in claim 9, wherein the transverse grooves tightly abut longitudinal grooves along the rim of an underlying glass plate during said film exposure.

* * * * *